(12) United States Patent
Whitefield et al.

(10) Patent No.: US 11,044,007 B2
(45) Date of Patent: Jun. 22, 2021

(54) SYSTEM AND APPARATUS FOR DISASTER BACKUP GATEWAY FOR A MULTI-GATEWAY SPOT BEAM SATELLITE

(71) Applicant: HUGHES NETWORK SYSTEMS, LLC, Germantown, MD (US)

(72) Inventors: David Whitefield, Germantown, MD (US); Michael J. Scott, Germantown, MD (US)

(73) Assignee: HUGHES NETWORK SYSTEMS, LLC, Germantown, MD (US)

(*) Notice: Subject to any disclaimer, the term of this patent is extended or adjusted under 35 U.S.C. 154(b) by 0 days.

(21) Appl. No.: 16/544,683

(22) Filed: Aug. 19, 2019

(65) Prior Publication Data

US 2020/0119807 A1 Apr. 16, 2020

Related U.S. Application Data

(60) Provisional application No. 62/744,048, filed on Oct. 10, 2018.

(51) Int. Cl.

| H04B 7/185 | (2006.01) |
| H04B 7/204 | (2006.01) |
| H04W 88/16 | (2009.01) |
| H04L 29/12 | (2006.01) |
| H04W 36/30 | (2009.01) |

(52) U.S. Cl.
CPC ..... *H04B 7/18519* (2013.01); *H04B 7/18517* (2013.01); *H04B 7/18534* (2013.01); *H04B 7/18541* (2013.01); *H04B 7/2041* (2013.01); *H04L 61/1511* (2013.01); *H04W 36/305* (2018.08); *H04W 88/16* (2013.01)

(58) Field of Classification Search
CPC H04W 36/0055; H04W 64/003; H04W 88/16
See application file for complete search history.

(56) References Cited

U.S. PATENT DOCUMENTS

| 2004/0185777 | A1  | 9/2004  | Bryson |
| 2009/0042562 | A1* | 2/2009  | Treesh ................ H04B 7/2041 455/428 |
| 2010/0315946 | A1  | 12/2010 | Salam et al. |
| 2012/0289225 | A1  | 11/2012 | Treesh et al. |
| 2013/0109299 | A1* | 5/2013  | Roos .................. H04B 7/18513 455/12.1 |

(Continued)

OTHER PUBLICATIONS

International Search Report and Written Opinion issued in PCT/US19/55534, dated Dec. 30, 2019.

*Primary Examiner* — Tu X Nguyen
(74) *Attorney, Agent, or Firm* — Jones Robb, PLLC

(57) ABSTRACT

A system and method for providing backup recovery from outage at a primary gateway in a satellite communication system. Upon detecting an alert indicative of an outage, communication between the primary gateway and a plurality of terminals located within spot beams serviced by the primary gateway is suspended. A pre-switchover routine is performed to initialize a backup gateway capable of being substituted for the primary gateway, and a switchover routine is performed to transfer operations from the primary gateway to the backup gateway. Communication is subsequently enabled between the backup gateway and the plurality of terminals.

22 Claims, 10 Drawing Sheets

(56) References Cited

U.S. PATENT DOCUMENTS

2016/0119054 A1* 4/2016 Foxworthy ............. H04L 67/12
                                                     370/319
2017/0339616 A1* 11/2017 Baudoin ............ H04B 7/18517
2017/0347363 A1   11/2017 Roy
2018/0159930 A1    6/2018 Watts et al.
2018/0288633 A1   10/2018 Jaulin et al.

* cited by examiner

SYSTEM AND APPARATUS FOR DISASTER BACKUP GATEWAY FOR A MULTI-GATEWAY SPOT BEAM SATELLITE

CROSS-REFERENCE TO RELATED APPLICATION

The present application claims priority to U.S. Provisional Patent Application No. 62/744,048 filed Oct. 10, 2018, and entitled "System and Apparatus for Disaster Backup Gateway for a Multi-Gateway Spot Beam Satellite", the entire disclosure of which is incorporated herein by reference. The present application is also related to U.S. patent application Ser. No. 16/546,060 filed Aug. 20, 2019, entitled "Gateway Diversity Switching", having common Applicant/Assignee, the entire disclosure of which is incorporated herein by reference.

BACKGROUND INFORMATION

High throughput satellite (HTS) systems are used to provide voice and data access in areas that may lack cellular or landline infrastructure. HTS systems typically employ multiple gateways (or satellite hubs) to provide service to customers utilizing very small aperture terminals (VSATs). The VSATs can be located within a multiplicity of user spot beams (or spot beams). Each gateway is communicatively connected to a designated set of user spot beams by means of a satellite. Each gateway is situated in a gateway spot beam (or gateway beam), and generally only a single gateway beam is connected to a specific spot beam. The gateway beams are distributed across an area so as to enable reuse of feederlink spectrum between gateways, thereby maximizing gateway (and system) capacity.

Availability of each given HTS Gateway is therefore vital for providing service to VSATs located within a set of user spot beams. In the event a gateway becomes unavailable, none of the VSATs located within the user spot beams associated with that gateway will be served. There are various conditions that may result in the gateway becoming unavailable. For example, short term, or temporary, gateway unavailability can be due to transient conditions, such as rain attenuation. In such circumstances, gateway unavailability may be mitigated by positioning a radio frequency (RF) diversity site which includes an antenna and necessary RF electronics within the same gateway beam, and connecting the diversity site to the same gateway baseband equipment as the primary RF equipment.

Longer periods service of unavailability can be caused by disastrous conditions at the gateway site, such antenna system failure, extended loss of power, fire, earthquake, flood, etc. Extended periods of service interruption can be mitigated, for example, using a satellite capable of reconfiguring connectivity between the gateway and user spot beams in flight. Thus, it would be possible to deploy a backup gateway within a backup gateway beam, and reconfigure the satellite to connect the backup gateway beam to the user spot beams that had been served by the failed primary gateway. Service can subsequently resume to VSATs in the user spot beams served by the failed primary via the backup gateway. Such reconfigurability, however, can increase costs and potentially reduce capacity of the satellite. If the satellite cannot be reconfigured, a backup gateway might be deployed in each gateway beam. A particular backup gateway can be switched into service, as necessary, in event of the primary gateway failure. Such a solution can be very expensive for a system with multiple gateways.

Based on the foregoing, there is a need for an approach to provide disaster backup recovery from extended outage of a primary gateway in a high throughput satellite system.

BRIEF SUMMARY

A system and method are disclosed for mitigating disaster and providing backup recovery from outage at a primary gateway. According to an embodiment, the system includes: a plurality of terminals; at least one satellite configured to: define a plurality of spot beams encompassing locations of the plurality of terminals, define at least one gateway beam, and facilitate communication to/from the plurality of terminals; and a primary gateway located within the gateway beam, and comprising: a transceiver configured to transmit and receive information to and from the plurality of terminals via the at least one satellite, a storage unit configured to store, at least in part, information pertaining to the primary gateway and the plurality of terminals, a fault management unit configured to generate an alert indicative of a failure or predicted failure at the primary gateway, and at least one processor configured to suspend communication between the primary gateway and the plurality of terminals, in response to detecting the alert. The system further includes a backup gateway comprising: a transceiver configured to transmit and receive information to and from the at least one satellite, a storage unit configured to store, at least in part, information pertaining to the backup gateway, the primary gateway, and the plurality of terminals, and at least one processor configured to enable communication with the plurality of terminals after communication with the primary gateway has been suspended, wherein the backup gateway is located outside a gateway beam encompassing the primary gateway and capable of being transported to a location within the gateway beam.

According to another embodiment, the method includes: detecting an alert indicative of a failure or predicted failure at a primary gateway in a satellite communication system; suspending communication between the primary gateway and a plurality of terminals located within spot beams serviced by the primary gateway, in response to the detected alert; performing a pre-switchover routine to initialize a backup gateway for replicating an instance of the primary gateway, the backup gateway being located outside a gateway beam encompassing the primary gateway and capable of being transported to a location within the gateway beam; performing a switchover routine to transfer operations from the primary gateway to the backup gateway; performing a post-switchover routine to enable communication with the backup gateway; and resuming communication with the plurality of terminals using the backup gateway.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

A system and method for mitigating disaster and providing backup recovery from outage at a primary gateway, are described. In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

Figure 1:
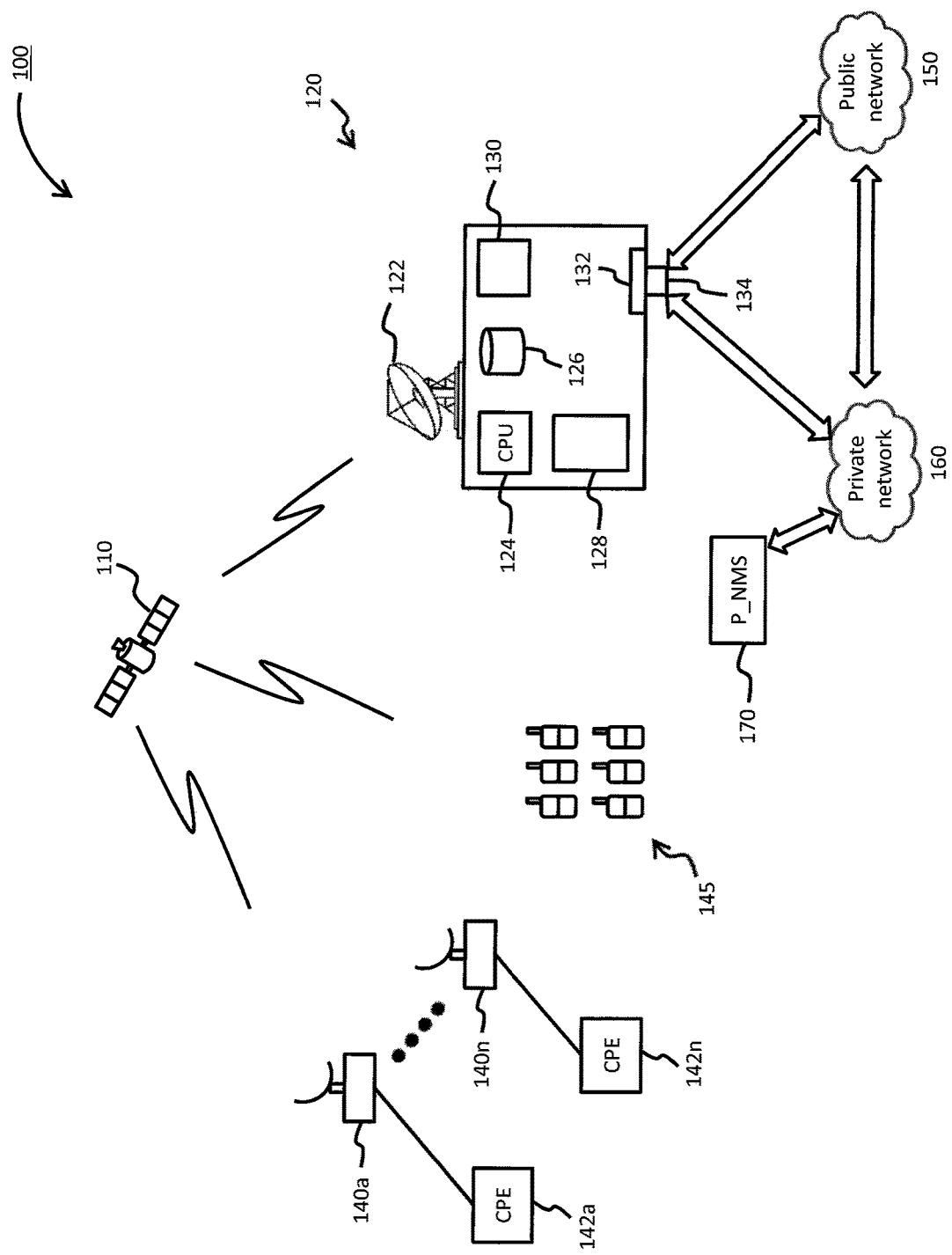
FIG. 1 is a diagram of a system capable of providing voice and data communication, according to one embodiment.

FIG. 1 illustrates a satellite communication system 100 capable of providing voice and data services. The satellite communication system 100 includes a satellite 110 that supports communications among a number of gateways 120 (only one shown) and multiple stationary satellite terminals 140a-140n. Each stationary satellite terminal (or terminal) 140 can be configured for relaying traffic between its customer premise equipment (CPEs) 142a-142n, a public network 150 such as the internet, and/or its private network 160. According to an exemplary embodiment, the terminals 140 can be in the form of very small aperture terminals (VSATs) that are mounted on a structure, habitat, etc. The terminals 140 typically remain in the same location once mounted, unless otherwise removed from the mounting. According various embodiments, the terminals 140 can be mounted on mobile platforms that facilitate transportation thereof from one location to another. Such mobile platforms can include, for example, cars, buses, boats, planes, etc. The terminals 140 can further be in the form of transportable terminals capable of being transported from one location to another. Such transportable terminals are operational only after arriving at a particular destination, and not while being transported.

As illustrated in FIG. 1, the satellite communication system 100 can also include a plurality of mobile terminals 145 that are capable of being transported to different locations by a user. In contrast to transportable terminals, the mobile terminals 145 remain operational while users travel from one location to another. The gateway 120 can be configured to route traffic from stationary, transportable, and mobile terminals (collectively terminals 140) across the public network 150 and private network 160 as appropriate. The gateway 120 can be further configured to route traffic from the public internet 150 and private network 160 across the satellite link to the appropriate terminal 140. The terminal 140 then routes the traffic to the appropriate customer premise equipment (CPE) 142.

According to at least one embodiment, the gateway 120 can include various components, implemented in hardware, software, or a combination thereof, to facilitate communication between the terminals 140 and external networks 150, 160 via the satellite 110. According to an embodiment, the gateway 120 can include a radio frequency transceiver 122 (RFT), a processing unit 124 (or computer, CPU, etc.), and a data storage unit 126 (or storage unit). As used herein, a transceiver corresponds to any type of antenna unit used to transmit and receive signals, a transmitter, a receiver, etc. The RFT is useable to transmit and receive signals within a communication system such as the satellite communication system 100 illustrated in FIG. 1. The data storage unit 126 can be used, for example, to store and provide access to information pertaining to various operations in the satellite communication system 100. According to other embodiments, the gateway 120 can include multiple processing units 124 and multiple data storage units 126 in order to accommodate the needs of a particular system implementation. The data storage unit 126 (or storage unit) can be configured, for example, as a single drive, multiple drives, an array of drives configured to operate as a single drive, etc. Although not illustrated in FIG. 1, the gateway 120 can also include one or more workstations 125 (e.g., computers, laptops, etc.) in place of, or in addition to, the one or more processing units 124. Various embodiments further provide for redundant paths for components of the gateway 120. The redundant paths can be associated with backup components capable of being seamlessly or quickly switched in the event of a failure or critical fault of the primary component.

According to the illustrated embodiment, the gateway 120 includes baseband components 128 which operate to process signals being transmitted to, and received from, the satellite 110. For example, the baseband components 128 can incorporate one or more modulator/demodulator units, system timing equipment, switching devices, etc. The modulator/demodulator units can be used to generate carriers that are transmitted into each spot beam and to process signals received from the terminals 140. The system timing equipment can be used to distribute timing information for synchronizing transmissions from the terminals 140.

According to an embodiment, a fault management unit 130 can be included in the gateway 120 to monitor activities and output one or more alerts in the event of a malfunction in any of the gateway components. The fault management unit 130 can include, for example, one or more sensors and interfaces that connect to different components of the gateway 120. The fault management unit 130 can also be configured to output alerts based on instructions received from a production network management system 170 (NMS). The production NMS 170 maintains, in part, information (configuration, processing, management, etc.) for the gateway 120, and all terminals 140 and beams supported by the gateway 120. The gateway 120 can further include a network interface 132, such as one or more edge routers, for establishing connections with a terrestrial connection point 134 from a service provider. Depending on the specific implementation, however, multiple terrestrial connection points 134 may be utilized.

Figure 2:
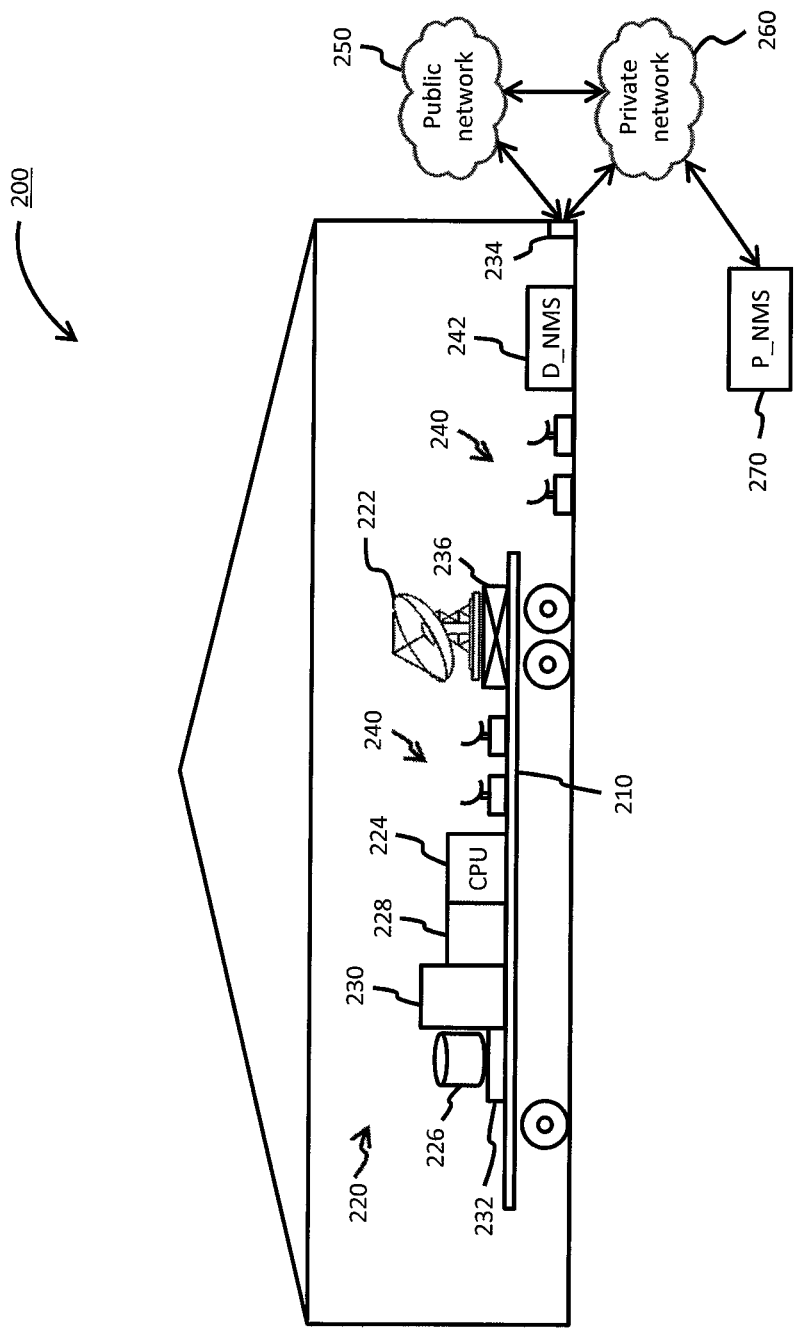
FIG. 2 is a diagram of a backup gateway capable of being used in the system of FIG. 1, according to one or more embodiments.

FIG. 2 illustrates a storage depot 200 for housing a backup gateway 220, in accordance with one or more embodiments. As illustrated in FIG. 2, the storage depot 200 can be in the form of a building, shed, or other structure with suitable space and technical hardware to maintain the backup gateway 220 in real-time, and to perform any necessary tests to verify viability thereof. For example, the storage depot 200 can include an interface for receiving power from a service provider. The storage depot 200 can also include wiring to facilitate power and data connection between various components. Furthermore, the storage depot can include hardware components such as wired and/or wireless routers, firewalls, servers, etc.

According to at least one embodiment, a mobile platform 210 is utilized for accommodating the various components of the backup gateway 220. The mobile platform 210 can be in the form of a trailer, flatbed, or other transportable vehicle capable of being transported from the storage depot 200 to the location of a failed primary gateway (e.g., gateway 120). Components of the backup gateway 220 can be secured to the mobile platform 210 so that they can be safely transported to different locations. The mobile platform 210 can be subsequently hitched (or connected) to a vehicle such as a pickup truck and transported to the failed primary gateway 120. Alternatively, the mobile platform 210 can be in the form of a semi-trailer that can be secured to a tractor unit and transported to the failed primary gateway 120. According to various implementations, the mobile platform 210 can include a partial enclosure to protect various components from external damage (e.g., rain, snow, animals, etc.), while keeping other components exposed. Alternatively, a retractable enclosure can be provided to protect all components of the backup gateway during transport, and expose only certain components upon arrival at the primary gateway site. A combination of partial and retractable enclosures can also be used.

As illustrated in FIG. 2, the backup gateway 220 contains various components which allow it to perform all of the functions of a failed primary gateway 120. For example, the backup gateway 220 includes an RFT 222 (or RFT antenna) capable of being aligned with appropriate satellites for establishing communication with existing terminals. According to at least one embodiment, the RFT 222 can be secured to a mounting unit 236 which is capable of moving the RFT 222 in a variety of positions. For example, the mounting unit 236 can be configured to orient the RFT 222 through rotation about X-Y-Z axes and align it with the satellite. The mounting unit 236 can further include extendable components which allow the RFT 222 to be raised and lowered on the mobile platform 210, or along the individual X-Y-Z axes.

According to one or more embodiments, the backup gateway 220 can include one or more processing units 224, to manage all of the associated components and overall operations thereof. Although a single processing unit 224 is illustrated, various embodiments can incorporate multiple processing units in the form of personal computers, servers, laptops, etc. Furthermore, as discussed in greater detail with respect to FIGS. 9 and 10, the processing units 224 can incorporate single and/or multicore CPUs, reduced instruction set computers (RISC), etc. The backup gateway 220 can further include a storage unit 226 for storing and providing access to various information regarding operation of the backup gateway 220, as well as the terminals supported by the primary gateway 120. For example, the storage unit 226 store information regarding all the primary gateways 120 that may be supported by the backup gateway 220. Additionally, information regarding specific terminals currently supported by the primary gateway 120 that can also be supported by the backup gateway 220 may be stored in the storage unit 226. According to at least one embodiment, some or all of the information stored in the storage unit 226 can be acquired from the production NMS 270 via the private network 260 prior to departure from the depot 220. According to other embodiments, the information can be acquired after the backup gateway 220 arrives at the primary gateway location 120 by establishing with the production NMS 170 via the private network 160, as illustrated in FIG. 1. The storage unit 226 can be configured as an individual drive, an array of drives, etc. Depending on the specific implementation, various additional information can also be maintained within the storage unit 226.

In order to facilitate proper transmission and reception of signals with the satellite 110, the backup gateway 220 also includes various baseband components 228 such as modulators, demodulators, system timing equipment, switching devices, etc. According to one or more embodiments, the baseband components 228 contained in the backup gateway 220 can be in the form of a superset of the baseband components contained in all of the primary gateways 120 supported by the backup gateway 220. Accordingly, when dispatched to a primary gateway 120 which has suffered a failure (or outage), only the specific baseband components supported by the failed primary gateway 120 are activated and utilized by the backup gateway 220.

As can be appreciated, each primary gateway 120 can include different components and configurations. The specific configuration of each primary gateway 120 can be based, at least in part, on the type of services offered and plans offered to consumers, spot beam location, etc. According to at least one embodiment, the configuration for different services can be abstracted to the baseband components. The service can, therefore, be configured to a particular processing instance. The processing instance can subsequently be assigned to a particular processing resource. Such abstraction can be done for some or all service configurations at the primary gateway 120. During the switchover process, a mapping of instance names can be applied to processing resources at the backup gateway 220, as appropriate, in order to properly replicate operation of the primary gateway 120 being switched out. Different mappings may be applied for different primary gateways 120 to reflect their different configurations.

According to an embodiment, such mappings can be prepared in advance so as to be available to enable switching of the backup gateway 220 for any given primary gateway 120. Once the mapping is applied, the backup gateway 220 can connect the production NMS 270 and download the configuration parameters for each processing resource. The configuration parameters can include, for example, communication channel assignments and parameters for terminals (fixed and mobile), configuration of management agents to serve and control the terminals, parameters for network processing to provide protocol services, addressing and address mapping for connectivity to terrestrial networks, etc.

According to at least one embodiment, various components of the backup gateway 220 are reconfigured such that they mirror the configurations previously used by components at the primary gateway 120. The components of the backup gateway 220, therefore, become capable of operating identically as the components of the primary gateway 120.

For example, the components such as a wide area network port (WAN), firewall, routers, edge routers, etc. of the backup gateway 220 can be reconfigured to mirror the configuration settings previously used with corresponding components of the primary gateway 120. Depending on the specific implementation, the backup gateway 220 can utilize identical or operationally equivalent components as the primary gateway 120. The configuration settings can simply be loaded into identical components. Configuration files for operationally equivalent components can be prepared in advance and loaded into the components as needed.

According to various embodiments, the backup gateway 220 can include a power supply 230 capable of providing sufficient current to all components required for operation of the backup gateway 220. For example, the power supply 230 can be in the form of a generator powered by diesel fuel, gasoline, propane, natural gas, etc. Such generators can be refueled by operations personnel during extended operation of the backup gateway 220. A short term battery system (e.g., 15-90 minutes) can be incorporated into the power supply 230, in various implementations, to automatically compensate for any interruptions in operation and/or setup of the generator.

According to one or more embodiments, redundant RFT communication paths of the primary gateway 120 are not incorporated into the backup gateway 220. Since the backup gateway 220 functions as a temporary replacement, such features can potentially result in unnecessary redundancy as well as increased costs. Such redundant communication paths can include, for example, hub enclosures for high power amplifiers (HPAs), block upconverters (BUCs), waveguide switching systems, etc. Such components can be manually replaced by service personnel in the event of a failure during operation of the backup gateway 220.

As further illustrated, a network interface 232 can be incorporated within the backup gateway 220 in order to facilitate connection to various external (i.e., terrestrial) networks. According to at least one embodiment, the network interface 232 can be in the form of an edge router or similar equipment. While maintained at the storage depot 200, the network interface 232 can be used to establish a connection with one or more terrestrial connection points 234, such as an interface with a private internet service provider (ISP). Once a connection is established, the backup gateway 220 can access a public network 250 and/or various private networks 260. According to at least one embodiment, the backup gateway 220 can utilize either the public network 250, the private network 260, or both in order to establish a connection to the production NMS 270. Various security protocols (e.g., encryption) can be implemented for providing end-to-end data security. Such a connection can be used, for example, to access configuration information for a failed primary gateway 120. Depending on the specific system implementation, the backup gateway 220 can be configured to also receive alerts pertaining to predicted events that could potentially result in primary gateway failures (or outages).

According to an embodiment, the network interface 232 can be used by backup gateway 220 to establish a connection to a depot NMS 242 when located at the storage depot 200. The depot NMS 242 can be physically located within the storage depot 200 or remotely located, depending on the specific implementation. Such a connection allows the backup gateway 220 to perform various functions which simulate normal operation within the satellite communication system, without interfering with actual (or live) transmissions. For example, various embodiments can incorporate multiple test terminals 240 capable of being located inside the storage depot 200 and/or the mobile platform 210. Test terminals 240 located in the storage depot 200, for example, can be mobile terminals capable of being moved to the mobile platform 210 prior to deployment. However, test terminals 240 located on the mobile platform 210 can be either fixed or mobile. The backup gateway 220 can be configured to access information from the depot NMS 242 and simulate communication with the test terminals 240. According to an embodiment, the actual transmit functions of the RFT 222 and the terminals 240 can be muted (i.e., turned off) in order to avoid interference with live communication signals in the system. A test communication link can subsequently be established between the test terminals 240 and the backup gateway 220 in order to simulate transmission and reception of signals. For example, the communication link can be between the test terminals 240 and components of the backup gateway 220 such as the baseband components 228 and RFT 222 instead of using their normal wireless satellite communication mechanisms. Depending on the specific implementation, the test communication link can be established using wired and/or wireless connections. All additional processing would then be performed by the backup gateway 220 and test terminals 240 as though actual signals are being transmitted and received within the network. Accordingly, the backup gateway 220 can be maintained in a state of readiness which facilitates quick deployment to the location of a failed primary gateway 120.

Figure 3:
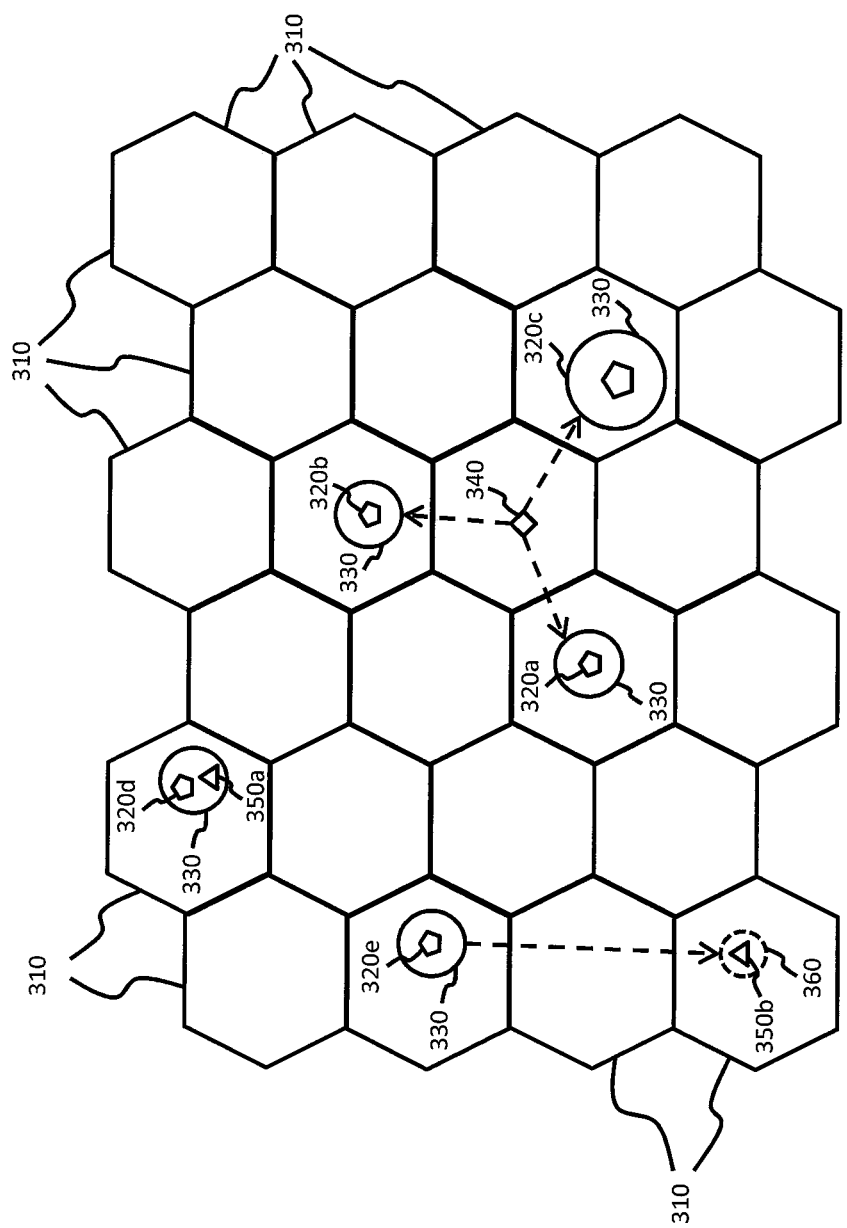
FIG. 3 is a diagram illustrating an arrangement of spot beams for providing coverage over a predetermined geographic region, according to at least one embodiment.

FIG. 3 illustrates an exemplary arrangement of spot beams 310 (also beams, satellite beams, coverage beams, or user beams) that can be used to provide satellite coverage over a predetermined geographic region. Each spot beam 310 overlays a particular geographic area and is used to provide service to terminals located within the geographic area. According to the illustrated embodiment, the spot beams 310 can be identically sized and arranged such that their edges abut each other. According to other embodiments, however, the spot beams 310 can have different shapes and/or sizes, and adjacent spot beams 310 may overlap each other. FIG. 3 further illustrates a plurality of primary gateways 320a-320e (collectively 320) that are located within predetermined spot beams 310. Furthermore, each primary gateway 320 resides within a specific gateway beam 330. Depending on the specific system requirements, the gateway beams 330 can be sized differently from each other and positioned at different locations within a particular spot beam 310. According to various embodiments, each primary gateway 320 can be configured to facilitate service to terminals located within a plurality of spot beams 310. For example, each primary gateway 320 may facilitate service to terminals located within six individual spot beams 310. It should be noted, however, that the number of spot beams 310 serviced by each primary gateway 320 can vary depending on the specific implementation.

According to the embodiment illustrated in FIG. 3, a backup gateway 340 (or transportable backup gateway) is located within a spot beam 310 such that it can be transported to any of three nearby primary gateways (320a, 320b, 320c). Depending on the specific implementation, however, the distance between the backup gateway 340 and the primary gateways 320a-320c can vary. For example, the backup gateway 340 can be located within a 100 mile radius of the primary gateways 320a-320c such that it can be transported to the primary gateway location within approximately 2 hours. Other implementations, however, can position the backup gateway within, e.g., a 400 mile radius of the primary gateways 320a-320c. Further implementations can optimize the location of the backup gateway 340 such that it can be transported to either of the primary gateways (320a-320c) in substantially the same time interval.

According to at least one embodiment, rather than transporting the backup gateway 340 to the location of a primary gateway 320a-320c after a failure, the backup gateway 340 can simply be transported such that it becomes located within the gateway beam 330 of the primary gateway 320 experiencing failure. According to such embodiments, the backup gateway 340 can be configured to determine new transmit parameters and supply the new transmit parameters to appropriate terminals within the spot beams 310. The new transmit (or transmit timing) parameters can be used, for example, to compensate for the location of the backup gateway 340 relative to the original location of the failed primary gateway 320. Accordingly, the terminals can remain synchronized so that they are able to transmit their individual data bursts at the appropriate time.

FIG. 3 further illustrates a fixed backup gateway 350a that is positioned within the same gateway beam 330 as primary gateway 320d. According to such embodiments, the backup gateway 350a is permanently positioned within the gateway beam 330 so that it can be quickly activated in the event the primary gateway 320d experiences a failure, predicted failure, or other emergency. Furthermore, various embodiments provide for use of the fixed backup gateway 350a in conjunction with the transportable backup gateway 340. For example, as illustrated in FIG. 3, the backup gateway 340 may be located too far from the primary gateway 320d to facilitate timely deployment. Accordingly, a fixed backup gateway 350a can be positioned and maintained within the same gateway beam 330 as the primary gateway 320d in order to provide service in the event of a failure.

According to at least one embodiment, it is possible to provide a fixed backup gateway 350b that is located outside of the gateway beam 330 of a primary gateway 320e. According to such embodiments, if the primary gateway 320e suffers a failure, the gateway beam 330 can be redefined such that it encompasses the fixed backup gateway 350b. More particularly, a new gateway beam 360 can be defined such that it encompasses the position of the fixed backup gateway 350b. According to such embodiments, the satellite (or satellites) utilized by the system can be configured with appropriate circuitry to dynamically redefine the position of different gateway beam 330. The satellite could, therefore, redefine the gateway beam 330 of a failed primary gateway 320e such that the redefined gateway beam 360 encompasses the location of the fixed backup gateway 350b. According to various implementations, the fixed backup gateway 350b can be used in conjunction with the fixed backup gateway and/or the transportable backup gateway 340.

Figure 4:
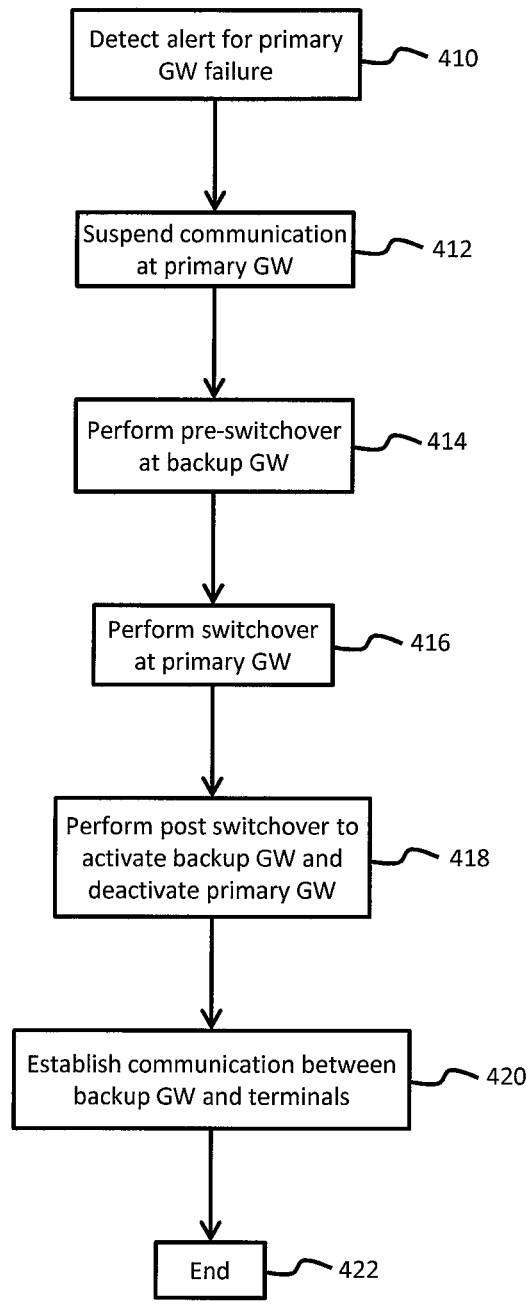
FIG. 4 is a flowchart of a process for mitigating disaster at a primary gateway, according to various embodiments.

FIG. 4 is a flowchart illustrating the various steps performed to mitigate disaster at a primary gateway by deploying a backup gateway, according to at least one embodiment. At 410, an alert is detected regarding a primary gateway failure. According to at least one embodiment, the alert can be generated by a fault management system at the primary gateway and transmitted to the storage depot where the backup gateway is located. The alert can be transmitted, for example, through the network interface and terrestrial connection point. According to other embodiments, potential failures can be predicted at the production NMS based on current and/or upcoming natural phenomena. For example, a severe hurricane which approaches an area serviced by the primary gateway can be utilized as an alert trigger for deploying the backup gateway due to anticipated power outages.

At 412, communication at the primary gateway is suspended. According to at least one embodiment, the primary gateway can issue commands to all terminals in the service coverage area to indicate that a temporary service interruption is imminent. According to other embodiments, each terminal can be configured to automatically suspend communication with the primary gateway for a preset time interval if a service interruption occurs. Thus, after the expiration of the preset time interval, the terminals would independently begin to reestablish communication with the primary gateway or the backup gateway based on the current operation status. For example, if the primary gateway returns to operational status prior to expiration of the preset time interval, the terminals would reestablish communication with the primary gateway. If the backup gateway is operational when the preset time interval expires, however, the terminals would reestablish communications with the backup gateway. Depending on the specific implementation, for example, the predetermined interval can be 15 min., 30 min., one hour, 2 hours, etc. The predetermined interval can be based on various conditions including, but not limited to the predicted travel time to transport the backup gateway to the location of the failed primary gateway, the amount of time required to switchover operations, etc.

At 414, a pre-switchover routine is performed at the backup gateway. The pre-switchover routine provides an opportunity for various components at the backup gateway to be initialized in advance of taking over operations for the primary gateway. At 416, a switchover routine is performed at the primary gateway. The switchover routine allows various operations performed by the primary gateway to be transferred to the backup gateway for continued service. Depending on the specific implementation, the various aspects of the pre-switchover routine can be performed prior to arrival at the primary gateway location and/or after arriving at the primary gateway location. Furthermore, various aspects of the pre-switchover routine can overlap with the switchover routine such that interaction may be required between the backup gateway and the primary gateway for successful completion of both routines. At 418, a post switchover routine is performed in order to activate the backup gateway and deactivate the primary gateway. At 420, communication is established between the backup gateway and the terminals previously serviced by the primary gateway. Thus, the terminals transparently interact with the backup gateway instead of the primary gateway. The process ends at 422.

Figure 5:
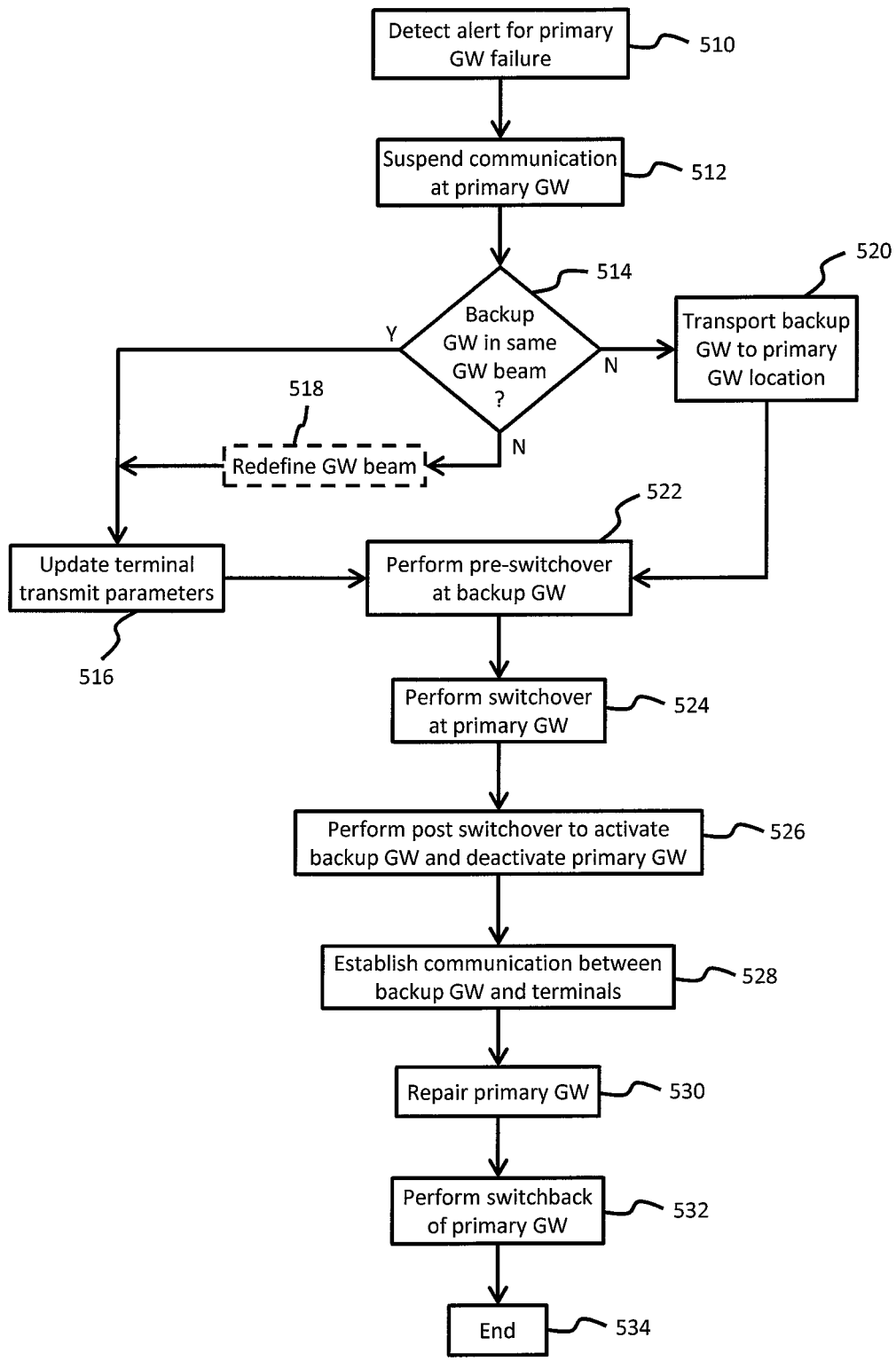
FIG. 5 is a flowchart of a process for mitigating disaster at a primary gateway, according to one or more embodiments.

FIG. 5 is a flowchart illustrating the various steps performed to mitigate disaster at a primary gateway by deploying a backup gateway, in accordance with various embodiments. At 510, an alert pertaining to the primary gateway failure is detected. As previously discussed, the alert can be generated at the primary gateway by the fault management system as a result of detecting the failure of one or more components. Alternatively, the production NMS can generate the alert based on predicted or impending natural disasters. At 512, communication at the primary gateway is suspended. Thus, information would no longer be exchanged between the primary gateway and the terminals. According to various embodiments, communication can be suspended for a predetermined time interval set by the primary gateway or preset within the terminals.

At 514, it is determined whether the backup gateway is located within the same gateway beam as the failed primary gateway. If the backup gateway is located within the same gateway beam, control passes to 516 where the terminal transmit parameters are updated. As previously discussed, the terminal transmit parameters may need to be adjusted depending on the location of the backup gateway relative to the location of the primary gateway in order to ensure proper receipt of signals from the terminals. Control then passes to 522. According to at least one embodiment, if the backup gateway is not located within the same gateway beam as the primary gateway, and the backup gateway is not transportable, control can optionally pass to 518 where the satellite can redefine the gateway beam such that it is positioned over location of the backup gateway. Control would then pass to 516 where the terminal transmit parameters would be updated based on the location of the backup gateway.

According to various embodiments, if the backup gateway is not located within the same gateway beam as the primary gateway, control passes to 520. The backup gateway would then be transported to the location of the primary gateway. Control then passes to 522 where a pre-switchover routine is performed at the backup gateway. As previously discussed, the pre-switchover routine includes various procedures intended to initialize components of the backup gateway in preparation of replacing the primary gateway. While FIG. 5 illustrates the backup gateway being transported prior to the pre-switchover routine, various embodiments provide for the reverse. As previously discussed, various aspects of the pre-switchover routine can be performed prior to transport, after transport, and concurrently with the switchover routine.

At 524, a switchover routine is performed at the primary gateway in order to transfer operation to the backup gateway. According to one or more embodiments, the functions of the pre-switchover routine and the switchover routine can overlap each other. According to further embodiments, the pre-switchover routine and the switchover routine can be performed simultaneously. Furthermore, the pre-switchover routine, or various portions thereof, can be performed while the backup gateway resides at the storage depot, while other portions can be performed after the backup gateway has been transported to the primary gateway location. At 526, a post switchover routine is performed to activate the backup gateway and deactivate the primary gateway. At 528, communication is transparently reestablished between the backup gateway and the terminals. Thus, the terminals are unaware that the primary gateway has failed and the backup gateway is currently being used as a replacement.

According to at least one embodiment, various repairs can be performed on the primary gateway at 530. Depending on the type of failure which has occurred, the actual repairs may vary. For example, if hardware components of the primary gateway have failed, they can be replaced and tested during the repair period. If a natural disaster has caused a power outage, however, then the repair process may simply entail awaiting restoration of power and confirming that no damage has occurred to the primary gateway. Furthermore, depending on the type of repair necessary, all components of the primary gateway may need to be transported to a separate location such as the storage depot in order to perform the necessary repairs. At 532, a switchback routine of the primary gateway is performed. More particularly, once the primary gateway has been repaired, the backup gateway can be replaced so that the primary gateway resumes operation. Furthermore, the backup gateway can be transported to the location of any other primary gateways experiencing a failure, or simply be returned to the storage depot. The process ends at 534.

Figure 6:
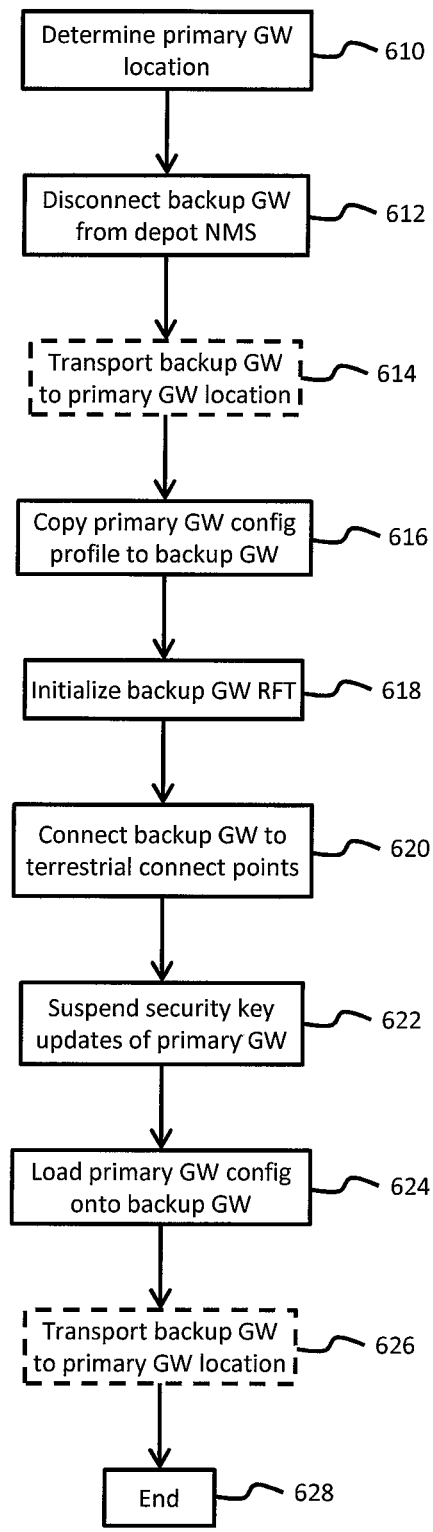
FIG. 6 is a flowchart of a process for performing a pre-switchover routine, according to at least one embodiment.

FIG. 6 is a flowchart detailing various steps performed during pre-switchover process. At 610, the location of the primary gateway is determined. At 612, the backup gateway is disconnected from the depot NMS. As previously discussed, the backup gateway can be connected to a depot NMS in order to conduct various tests and activities to ensure viability and readiness for deployment. Prior to replacing the primary gateway, however, the backup gateway is disconnected from the depot NMS in order to facilitate connection to the production NMS. According to at least one embodiment, at 614, the backup gateway is transported to the primary gateway location. As previously discussed, various types of vehicles (tractor unit, truck, etc.) can be used to move the entire backup gateway to a desired location.

At 616, the primary gateway's configuration profile is copied, for example, to the storage unit of the backup gateway. According to at least various embodiments, the configuration profile can include communication channel assignments and parameters for terminals (fixed and mobile), configuration of management agents to serve and control the terminals, parameters for network processing to provide protocol services, addressing and address mapping for connectivity to terrestrial networks, etc. While FIG. 6 illustrates the primary gateway's configuration profile being copied to the backup gateway after arriving at the primary gateway location, it should be noted that various embodiments provide for this to be done prior to transporting the backup gateway. The backup gateway can connect to the production NMS, for example, and download the necessary configuration profile as soon as an alert indicative of a primary gateway failure is detected.

At 618, the RFT for the backup gateway is initialized, for example, by controlling the mounting unit to adjust the RFT orientation such that it points at the satellite. Furthermore, connections can be made to supply power and data to the RFT. At 620, the backup gateway is connected to the appropriate terrestrial connection points. Depending on the specific implementation, the terrestrial connection points can correspond to connection interfaces established by an Internet service provider (ISP). Furthermore, the backup gateway can incorporate components such as an edge router in order to establish a physical connection with the terrestrial connection points. At 622, security updates (e.g., security codes, encryption keys, etc.) from the primary gateway are suspended. According to an embodiment, this can correspond to the periodic exchange of security keys from the primary gateway to all supported terminals currently facilitating active communication sessions. The security keys can be exchanged, for example, based on predetermined parameters and/or time intervals in order to maintain confidentiality and integrity. Periodic exchange of the security keys can also reduce the probability of compromising (or cracking) the active key.

At 624, the configuration profile of the primary gateway is loaded onto the backup gateway. According to various embodiments, this can involve loading the configuration parameters that have been transferred from the primary gateway into a memory so that they can be executed by the backup gateway's processing unit. This can be used to verify that all necessary information has been transferred to the backup gateway and all services are ready to go live. According to at least one embodiment, all of the previous steps can be performed prior to transporting the backup gateway to the primary gateway location, as indicated at 626. It should be noted however, that various steps involved in the pre-switchover routine can be interchanged without affecting results of the pre-switchover routine. Furthermore, the pre-switchover routine can be interrupted at any point in order to transport the backup gateway. The process ends at 628.

Figure 7:
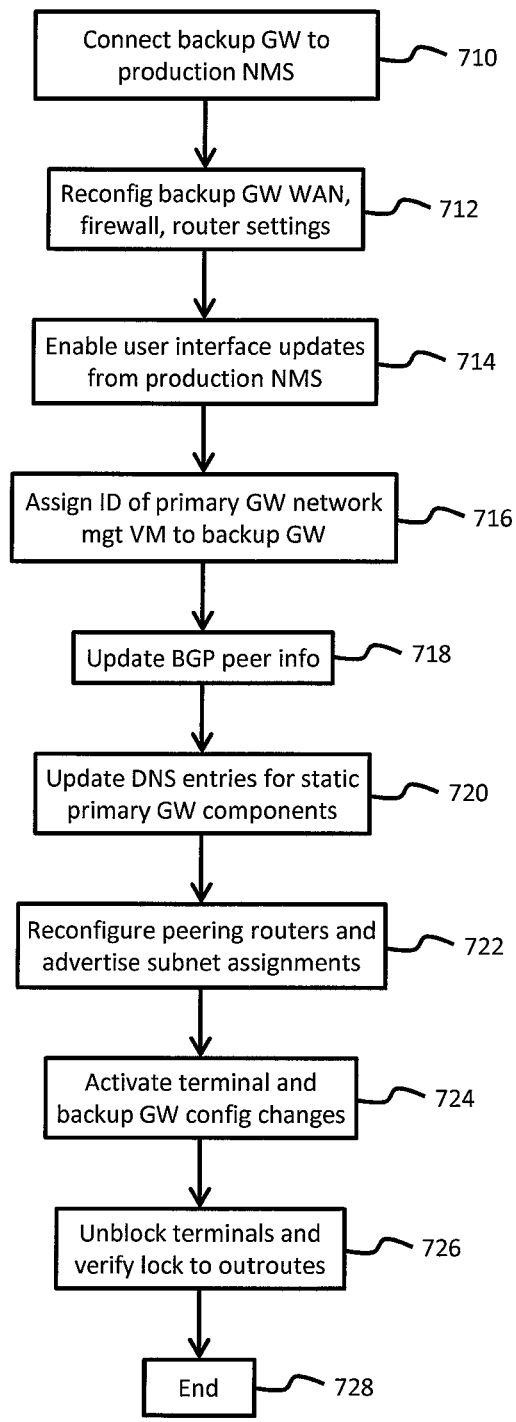
FIG. 7 is a flowchart of a process for performing a switchover routine, according to various embodiments.

FIG. 7 is a flowchart detailing various steps performed during pre-switchover process. At 710, the backup gateway is connected to the production NMS. Accordingly, the backup gateway would begin to receive all current information pertaining to the terminals being supported by the primary gateway. Depending on the specific implementation, the backup gateway may download the primary gateway's configuration information from the production NMS. At 712, various components of the backup gateway are reconfigured. For example, the router and firewall settings can be reconfigured to recognize components of the backup gateway corresponding to the components previously associated with the primary gateway. Furthermore, the wide area network (WAN) port of the router can be reconfigured based on the specific components associated with the backup gateway, and to facilitate remote access to the backup gateway. At 714, user interface updates received from the production NMS are enabled. At 716, the identification of the primary gateway's network management virtual machine instance is assigned to the backup gateway.

At 718, border gateway protocol (BGP) information is updated in order to facilitate routing decisions based on the same policies and routing paths previously applied by the primary gateway. At 720, domain name system (DNS) entries for static components of the primary gateway are updated. According to at least one embodiment, DNS information is maintained at, and translation service is performed by, the production NMS. The backup gateway can optionally maintain a cached version of some or all DNS information previously obtained from the NMS. Depending on the specific implementation, the cached information can be updated periodically or allowed to expire. At 722, peering routers associated with the primary gateway and/or backup gateway are reconfigured to advertise new subnet assignments associated with the backup gateway. At 724, any configuration changes in the terminals and the backup gateway are activated. For example, if the transmit parameters of the terminals are changed, the new configurations would be activated to reflect such changes. Furthermore, all the configuration changes made at the backup gateway based on the primary gateway are activated.

At 726, the terminals are unblocked so that they can establish communication with the backup gateway using parameters supplied by the backup gateway. Such parameters can include, in part, inroute/outroute frequency assignments, symbol rates, coding rates, modulation schemes, etc. Depending on the specific implementation, the backup gateway can be configured to monitor terminal activity for a predetermined amount of time (e.g., 10 minutes, 20 minutes, 30 minutes, 60 minutes, 90 minutes, 120 minutes, etc.) in order to verify that the terminals are able to reliably lock to appropriate outroutes for establishing communications links with the backup gateway. Thus, the progression of terminals successively reestablishing communication with the backup gateway relative to the total number of active terminals prior to failure of the primary gateway. According to an embodiment, a threshold can be set to establish when an acceptable number of terminals have returned to active status, thereby accounting for terminals that may have become inactive during the primary gateway failure. For example, the threshold can be set at 85%, 90%, 95%, 97%, 99%, etc. The process ends at 728.

Figure 8:
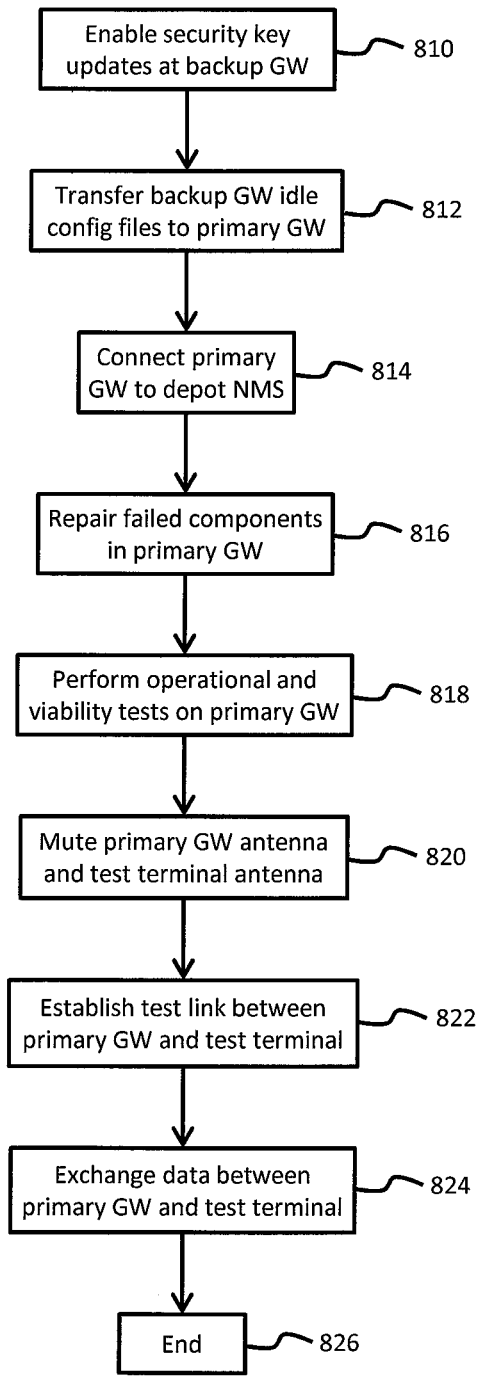
FIG. 8 is a flowchart of a process for performing a post-switchover routine, according to one embodiment.

FIG. 8 is a flowchart detailing various steps performed during the post-switchover process. At 810, security key updates are enabled at the backup gateway in order to securely resume updates of security session keys with all supported terminals. At 812, the backup gateway's idle configuration files are transferred to the primary gateway. As previously discussed, various embodiments allow for various components of the primary gateway to be repaired onsite and/or transported to the storage depot. According to such embodiments, the configuration files previously used by the backup gateway can be transferred to the primary gateway so that the primary gateway can function as the backup gateway during repairs. At 814, the primary gateway is connected to the depot NMS. Depending on the specific implementation, the primary gateway can retrieve the idle configuration files from the depot NMS.

At 816, various failed components in the primary gateway can be repaired and/or replaced. At 818, various operational and viability tests are performed on the primary gateway in order to determine its readiness for redeployment. At 820, the primary gateway's RFT is muted (or disabled). The RFT of any test terminals associated with the backup gateway are also muted. Depending on the specific failure at the primary gateway, the RFT may be independently tested without affecting active communication links with the satellite communication system. Furthermore, the test terminals can be maintained at the primary gateway and/or transported with the backup gateway. At 822, a test link is established between the primary gateway and the test terminals. As previously discussed, wired and/or wireless connections can be established to simulate signal transmission (voice, data, control, etc.) between the primary gateway and the test terminals. At 824, data is exchanged between the primary gateway and the test terminals. The data can be exchanged, for example, until service personnel are satisfied that the primary gateway has been successfully repaired and can be returned to operation. The data can also be exchanged for a preset time period, and terminated if any errors are within acceptable system parameters. The process ends at 826.

Various features described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. For example, such hardware/software/firmware combinations can be incorporated into, or used to implement, the previously described receivers, transmitters, transceivers, gateway, network management system, fault management unit, modulator/demodulator, etc. Various interfaces can be implemented via software using software defined networking (SDN) and network function virtualization (NFV) techniques. Additionally, such hardware can be interfaced to connect and/or facilitate communication between different components such as the baseband components and the RFT, gateways and terminals, etc. Furthermore, various features can be implemented using algorithms illustrated in the form of flowcharts and accompanying descriptions. Some or all steps associated with such flowcharts can be performed in a sequence independent manner, unless otherwise indicated.

The terms software, computer software, computer program, program code, and application program may be used interchangeably and are generally intended to include any sequence of machine or human recognizable instructions intended to program/configure a computer, processor, server, etc. to perform one or more functions. Such software can be rendered in any appropriate programming language or environment including, without limitation: C, C++, C #, Python, R, Fortran, COBOL, assembly language, markup languages (e.g., HTML, SGML, XML, VoXML), Java, JavaScript, etc. As used herein, the terms processor, microprocessor, digital processor, and CPU are meant generally to include all types of processing devices including, without limitation, single/ multi-core microprocessors, digital signal processors (DSPs), reduced instruction set computers (RISC), general-purpose (CISC) processors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components. Such exemplary hardware for implementing the described features are detailed below.

Figure 9:
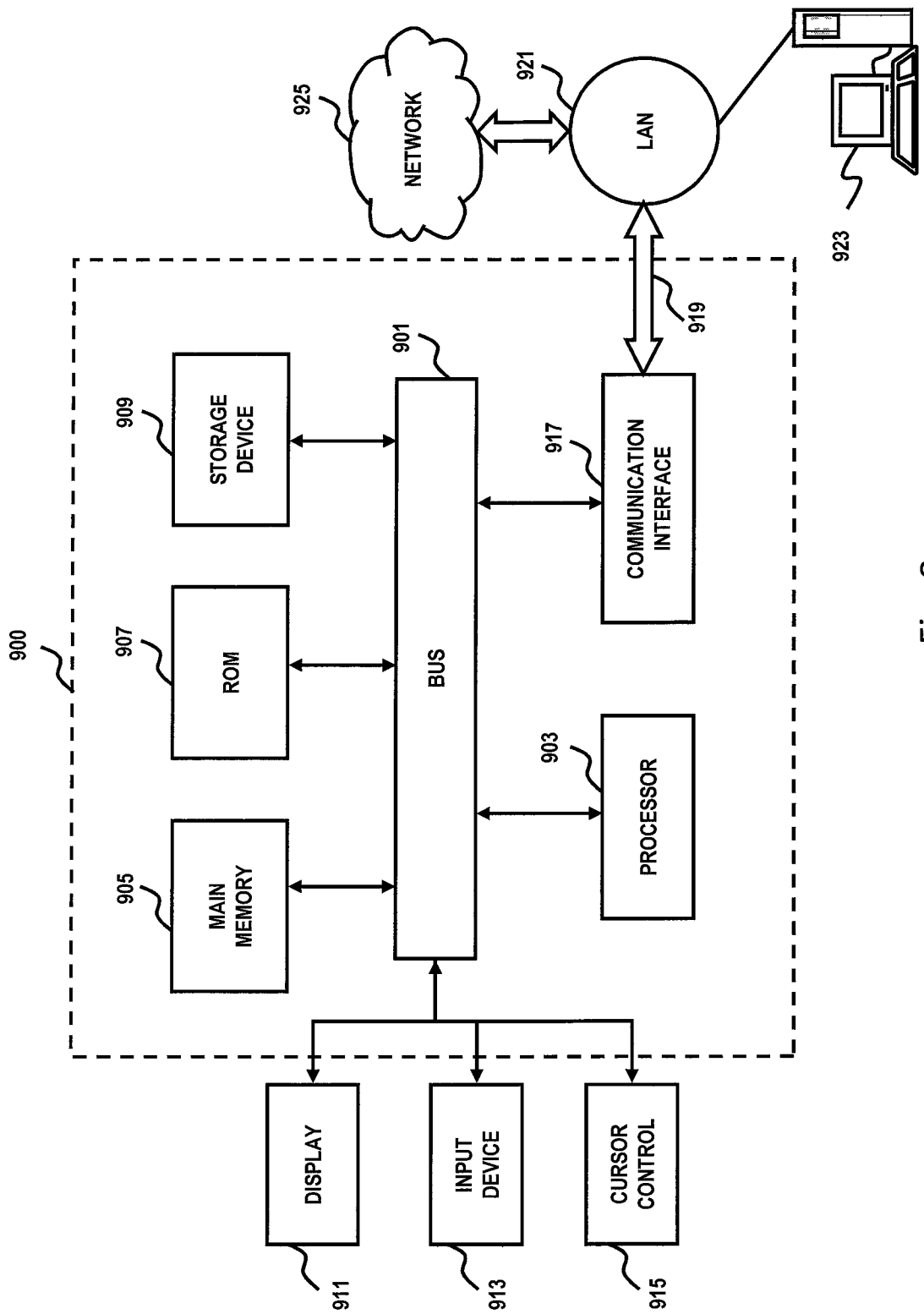
FIG. 9 is a diagram of a computer system that can be used to implement various exemplary features and embodiments.

FIG. 9 is a diagram of a computer system that can be used to implement features of various embodiments. The computer system 900 includes a bus 901 or other communication mechanism for communicating information and a processor 903 coupled to the bus 901 for processing information. The computer system 900 also includes main memory 905, such as a random access memory (RAM), dynamic random access memory (DRAM), synchronous dynamic random access memory (SDRAM), double data rate synchronous dynamic random-access memory (DDR SDRAM), DDR2 SDRAM, DDR3 SDRAM, DDR4 SDRAM, etc., or other dynamic storage device (e.g., flash RAM), coupled to the bus 901 for storing information and instructions to be executed by the processor 903. Main memory 905 can also be used for storing temporary variables or other intermediate information during execution of instructions by the processor 903. The computer system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computer system 900 may be coupled via the bus 901 to a display 911, such as a light emitting diode (LED) or other flat panel displays, for displaying information to a computer user. An input device 913, such as a keyboard including alphanumeric and other keys, is coupled to the bus 901 for communicating information and command selections to the processor 903. Another type of user input device is a cursor control 915, such as a mouse, a trackball, or cursor direction keys, for communicating direction information and command selections to the processor 903 and for controlling cursor movement on the display 911. Additionally, the display 911 can be touch enabled (i.e., capacitive or resistive) in order facilitate user input via touch or gestures.

According to an exemplary embodiment, the processes described herein are performed by the computer system 900, in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multiprocessing arrangement may also be employed to execute the instructions contained in main memory 905. In alternative embodiments, hard-wired circuitry may be used in place of or in combination with software instructions to implement exemplary embodiments. Thus, exemplary embodiments are not limited to any specific combination of hardware circuitry and software.

The computer system 900 also includes a communication interface 917 coupled to bus 901. The communication interface 917 provides a two-way data communication coupling to a network link 919 connected to a local network 921. For example, the communication interface 917 may be a digital subscriber line (DSL) card or modem, an integrated services digital network (ISDN) card, a cable modem, fiber optic service (FiOS) line, or any other communication interface to provide a data communication connection to a corresponding type of communication line. As another example, communication interface 917 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 917 sends and receives electrical, electromagnetic, or optical signals that carry digital data streams representing various types of information. Further, the communication interface 917 can include peripheral interface devices, such as a Universal Serial Bus (USB) interface, a High Definition Multimedia Interface (HDMI), etc. Although a single communication interface 917 is depicted in FIG. 9, multiple communication interfaces can also be employed. Furthermore, various features of the networking environment can be implemented using software defined networks (SDN) or virtualized.

The network link 919 typically provides data communication through one or more networks to other data devices. For example, the network link 919 may provide a connection through local network 921 to a host computer 923, which has connectivity to a network 925 such as a wide area network (WAN) or the Internet. The local network 921 and the network 925 both use electrical, electromagnetic, or optical signals to convey information and instructions. The signals through the various networks and the signals on the network link 919 and through the communication interface 917, which communicate digital data with the computer system 900, are exemplary forms of carrier waves bearing the information and instructions.

The computer system 900 can send messages and receive data, including program code, through the network(s), the network link 919, and the communication interface 917. In the Internet example, a server (not shown) might transmit requested code belonging to an application program for implementing an exemplary embodiment through the network 925, the local network 921 and the communication interface 917. The processor 903 may execute the transmitted code while being received and/or store the code in the storage device 909, or other non-volatile storage for later execution. In this manner, the computer system 900 may obtain application code in the form of a carrier wave.

The term "computer-readable medium" as used herein refers to any medium that participates in providing instructions to the processor 903 for execution. Such a medium may take many forms, including but not limited to non-volatile media, volatile media, and transmission media. Non-volatile media include, for example, optical or magnetic disks, such as the storage device 909. Non-volatile media can further include flash drives, USB drives, microSD cards, etc. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a USB drive, microSD card, hard disk drive, solid state drive, optical disk (e.g., DVD, DVD RW, Blu-ray), or any other medium from which a computer can read.

Figure 10:
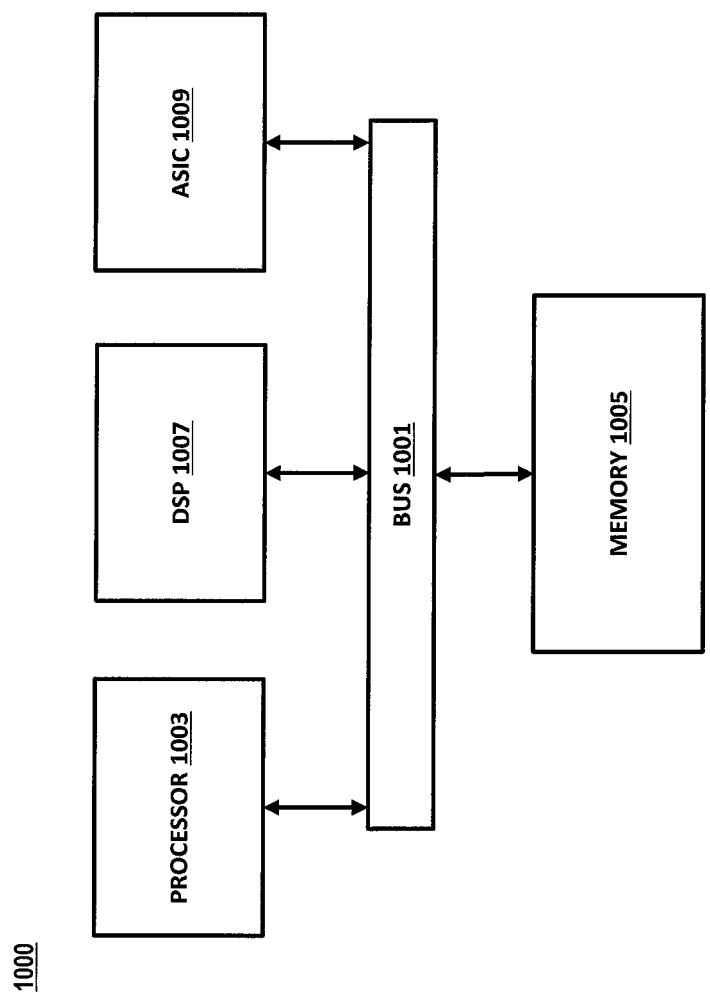
FIG. 10 is a diagram of a chip set that can be used to implement various exemplary features and embodiments.

FIG. 10 illustrates a chip set 1000 upon which features of various embodiments may be implemented. Chip set 1000 is programmed to implement various features as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1000, or a portion thereof, constitutes a means for performing one or more steps of the figures.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, re-writable optical disk, etc.) and static memory (e.g., ROM, CD-ROM, DVD, BLU-RAY disk, etc.) for storing executable instructions that when executed perform the inventive steps described herein. The memory 1005 also stores the data associated with or generated by the execution of the inventive steps.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. A method comprising:
   detecting an alert indicative of a failure or predicted failure at a primary gateway in a satellite communication system;
   suspending communication between the primary gateway and a plurality of terminals located within spot beams serviced by the primary gateway, in response to the detected alert;
   performing a pre-switchover routine to initialize a backup gateway for replicating an instance of the primary gateway, the backup gateway being located outside a gateway beam encompassing the primary gateway and capable of being transported to a location within the gateway beam;
   performing a switchover routine to transfer operations from the primary gateway to the backup gateway;
   performing a post-switchover routine to enable communication with the backup gateway; and
   resuming communication with the plurality of terminals using the backup gateway.

2. The method of claim 1, further comprising performing a switchback routine to replace the backup gateway with the primary gateway when the failure has been resolved.

3. The method of claim 1, wherein performing
   a pre-switchover routine includes updating transmit timing parameters of the plurality of terminals based, at least in part, on the location of the backup gateway relative to the primary gateway within the gateway beam.

4. The method of claim 1, wherein the alert is indicative of a partial failure or predicted partial failure, and further comprising:
   transporting the backup gateway to the location of the primary gateway;
   connecting components from the backup gateway which correspond to failed components of the primary gateway; and
   resuming communication with components from both the backup gateway and the primary gateway.

5. The method of claim 1, wherein performing a switchover routine further updating
   timing parameters of the plurality of terminals based, at least in part, on the location of the backup gateway relative to the primary gateway within the gateway beam.

6. The method of claim 1, further comprising:
   at least one additional primary gateway,
   wherein the backup gateway is located within a predetermined distance from the primary gateway and the at least one additional primary gateway,
   wherein the backup gateway is located outside at least one additional gateway beam encompassing the at least one additional primary gateway, and
   wherein performing a pre-switchover routine further comprises transporting the backup gateway to the location of either the primary gateway or the at least one additional primary gateway experiencing the failure.

7. The method of claim 1, wherein performing a pre-switchover routine further comprises:
   transporting the backup gateway to a location of the primary gateway;
   copying a configuration profile of the primary gateway to a storage unit of the backup gateway, the configuration profile including, at least in part, information pertaining to the spot beams serviced by the primary gateway and configuration files for the plurality of terminals located within the spot beams;
   initializing a radio frequency transceiver (RFT) associated with the backup gateway; and
   establishing a communication link between the backup gateway and at least one terrestrial network.

8. The method of claim 7, wherein performing a pre-switchover routine further comprises:
  suspending security key updates from the primary gateway for a predetermined time interval;
  switching management services at the backup gateway from a depot network management system (NMS) to a production NMS; and
  loading the primary gateway's processing instance configuration assignments into the backup gateway.

9. The method of claim 1, wherein performing a switchover routine further comprises:
  establishing a connection between the backup gateway and a production NMS over a communication link established with at least one terrestrial network;
  enabling user interface updates from the production NMS;
  assigning the primary gateway's network management virtual machine identity to the backup gateway; and
  updating entries in a domain name system (DNS) server associated with the backup gateway with entries corresponding to components of the primary gateway.

10. The method of claim 9, wherein performing a switchover routine further comprises:
  reconfiguring a wide area network (WAN) port, firewall, and router configurations of the backup gateway to mirror the primary gateway;
  updating border gateway protocol (BGP) peer information;
  reconfiguring peering routers to advertise subnet assignments; and
  verifying the plurality of terminals lock to outroutes in the satellite communication system.

11. The method of claim 1, wherein performing a post-switchover routine comprises:
  enabling security key updates for the satellite communication system at the backup gateway;
  transferring the backup gateway's idle configuration files to the primary gateway; and
  repairing one or more components associated with the primary gateway.

12. The method of claim 11, wherein repairing one or more components comprises:
  connecting the primary gateway to a depot NMS; and
  performing one or more tests on the primary gateway to assess operation and viability for redeployment.

13. The method of claim 12, wherein performing one or more tests comprises:
  muting transmit functions of RFTs associated with the primary gateway and at least one test terminal;
  establishing a test communication link between the primary gateway and the at least one test terminal; and
  exchanging data between the primary gateway and the at least one test terminal.

14. A system comprising:
  a plurality of terminals;
  at least one satellite configured to:
    define a plurality of spot beams encompassing locations of the plurality of terminals,
    define at least one gateway beam, and
    facilitate communication to/from the plurality of terminals;
  a primary gateway located within the gateway beam, and comprising:
    a transceiver configured to transmit and receive information to and from the plurality of terminals via the at least one satellite,
    a storage unit configured to store, at least in part, information pertaining to the primary gateway and the plurality of terminals,
    a fault management unit configured to generate an alert indicative of a failure or predicted failure at the primary gateway, and
    at least one processor configured to suspend communication between the primary gateway and the plurality of terminals, in response to detecting the alert; and
  a backup gateway comprising:
    a transceiver configured to transmit and receive information to and from the at least one satellite,
    a storage unit configured to store, at least in part, information pertaining to the backup gateway, the primary gateway, and the plurality of terminals, and
    at least one processor configured to enable communication with the plurality of terminals after communication with the primary gateway has been suspended,
  wherein the backup gateway is located outside a gateway beam encompassing the primary gateway and capable of being transported to a location within the gateway beam.

15. The system of claim 14, wherein the
at least one processor of the backup gateway is further configured to update transmit timing parameters of the plurality of terminals based, at least in part, on the location of the backup gateway relative to the primary gateway.

16. The system of claim 14, wherein the
at least one processor of the backup gateway is configured to update transmit timing parameters of the plurality of terminals based, at least in part, on the location of the backup gateway relative to the primary gateway within the gateway beam.

17. The system of claim 14, further comprising:
at least one additional primary gateway,
  wherein the backup gateway is located within a predetermined distance from the primary gateway and the at least one additional primary gateway,
  wherein the backup gateway is located outside at least one additional gateway beam encompassing the at least one additional primary gateway, and
  wherein the backup gateway is disposed on a mobile platform capable of being transported to the location of either the primary gateway or the at least one additional primary gateway experiencing the failure.

18. The system of claim 14, wherein the backup gateway further comprises:
  a network interface for establishing a communication link with at least one terrestrial network,
  wherein the at least one processor of the backup gateway is further configured to:
    copy a configuration profile of the primary gateway to a storage unit of the backup gateway, the configuration profile including, at least in part, information pertaining to the spot beams serviced by the primary gateway and configuration files for the plurality of terminals located within the spot beams, and
    initialize the transceiver associated with the backup gateway.

19. The system of claim 18, wherein:
the at least one processor of the primary gateway is configured to suspend security key updates for a predetermined time interval; and the at least one processor of the backup gateway is configured to:
- switch management services from a depot network management system (NMS) to a production NMS, and
- load the primary gateway's processing instance configuration assignments.

20. The system of claim 14, wherein the at least one processor of the backup gateway is further configured to:
- establish a connection with a production NMS over a communication link established with at least one terrestrial network;
- enable user interface updates from the production NMS;
- assume the primary gateway's network management virtual machine identity; and
- update entries in a domain name system (DNS) server with entries corresponding to components of the primary gateway.

21. The system of claim 20, wherein the at least one processor of the backup gateway is further configured to:
- reconfigure a wide area network (WAN) port, firewall, and router configurations to mirror the primary gateway;
- update border gateway protocol (BGP) peer information;
- reconfigure peering routers to advertise subnet assignments; and
- verify the plurality of terminals lock to outroutes in the satellite communication system.

22. The system of claim 14, wherein the at least one processor of the backup gateway is further configured to:
- enable security key updates for the satellite communication system at the backup gateway; and
- transfer the backup gateway's idle configuration files to the primary gateway.

* * * * *